(12) United States Patent
Koos et al.

(10) Patent No.: US 8,081,851 B2
(45) Date of Patent: Dec. 20, 2011

(54) ELECTROOPTICAL HIGH-INDEX CONTRAST WAVEGUIDE COMPONENT

(75) Inventors: Christian Koos, Siegelsbach (DE); Jurg Leuthold, Walzbachtal (DE); Wolfgang Freude, Karlsruhe (DE); Jan Michael Brosi, Karlsruhe (DE)

(73) Assignee: Karlsruher Institut fur Technologie (DE)

( * ) Notice: Subject to any disclaimer, the term of this patent is extended or adjusted under 35 U.S.C. 154(b) by 313 days.

(21) Appl. No.: 12/442,176

(22) PCT Filed: Sep. 14, 2007

(86) PCT No.: PCT/EP2007/008008
§ 371 (c)(1),
(2), (4) Date: Aug. 17, 2009

(87) PCT Pub. No.: WO2008/034559
PCT Pub. Date: Mar. 27, 2008

(65) Prior Publication Data
US 2010/0021124 A1    Jan. 28, 2010

(30) Foreign Application Priority Data
Sep. 21, 2006   (DE) .................. 10 2006 045 102.3

(51) Int. Cl.
*G02F 1/035* (2006.01)
*G02B 6/00* (2006.01)

(52) U.S. Cl. ........... 385/2; 385/1; 385/14; 385/8; 385/9; 385/28; 385/40; 385/131; 385/141

(58) Field of Classification Search .................. 385/1, 2, 385/3, 5, 6, 7, 8, 9, 10, 14, 129, 130, 131, 385/132, 141, 30, 29, 28, 40, 41, 42, 39
See application file for complete search history.

(56) References Cited

U.S. PATENT DOCUMENTS

| | | | |
|---|---|---|---|
| 6,993,212 B2 | 1/2006 | Block et al. ...................... 385/3 |
| 7,200,308 B2 * | 4/2007 | Hochberg et al. ............. 385/122 |
| 7,424,192 B2 * | 9/2008 | Hochberg et al. ............. 385/122 |
| 7,894,696 B2 * | 2/2011 | Baehr-Jones et al. ......... 385/122 |
| 2003/0053730 A1 | 3/2003 | Seino ................................ 385/2 |
| 2003/0174982 A1 | 9/2003 | Ridgway et al. .............. 385/123 |
| 2005/0054199 A1 * | 3/2005 | Block et al. .................... 438/689 |
| 2005/0179986 A1 | 8/2005 | Gothoskar et al. ............ 359/321 |
| 2006/0056768 A1 | 3/2006 | Nippa et al. ..................... 385/40 |
| 2006/0291791 A1 * | 12/2006 | Hochberg et al. ............. 385/132 |
| 2010/0021124 A1 * | 1/2010 | Koos et al. ..................... 385/141 |

OTHER PUBLICATIONS

XP-002464137 "TiO2-Waveguide with ZnO-ZnO: Al cladding for active optical subsystems" Photonic Integrated Systems Proceedings of SPIE vol. 4998 (2003).

(Continued)

*Primary Examiner* — Brian Healy
(74) *Attorney, Agent, or Firm* — Reising Ethington P.C.

(57) ABSTRACT

A high-index contrast waveguide component is presented, which is based on the fast changing of the transmission properties of an optical waveguide by applying electric voltages, or by embossing electric currents. The waveguide consists of a high-refractive waveguide core surrounded by a low-refractive surrounding material, which at least area by area has electro-optical properties. By applying a voltage to completely or partially optically transparent electrodes, an electric field is generated having a strong overlap with the optical mode, being in interaction with it, and therefore changing the transmission properties of the waveguide. The transparent electrodes or supply line areas are laminar, connected at low resistance with conductor paths of high conductivity by means of structures continually repeated along the propagation direction. Thus, it is possible for example to very fast load the capacity being effective between the electrodes, and to thus achieve a high electric band width. In certain embodiments, the waveguide core itself consists of one or more electrically conductive stripes being used as electrodes at the same time. These embodiments make especially small switching voltages possible.

For example, the presented component makes fast electro-optical modulators with small switching voltages possible, which modulators may be integrated together with electronic components on a common semiconductor substrate (e.g. silicon).

25 Claims, 5 Drawing Sheets

OTHER PUBLICATIONS

XP-008028352 "Organic-On-Inorganic Guided Wave Modulator" Microwave and Optical Technology Letters/Vol. 3 No. 3 Mar. 1990.
Schoer G. et al. "TiO2-Wave with ZnO-Zno:Al cladding for active optical subsystems" Proceedings of SPIE vol. 4998 (2003) pp. 105-113 XP-002464137.

Ryley J.F., et al. "Organic-on-Inorganic Guided Wave Modulator" Microwave and Technology Letters vol. 3, No. 3, Mar. 1990 pp. 83-85 XP-008028352.

* cited by examiner

ELECTROOPTICAL HIGH-INDEX CONTRAST WAVEGUIDE COMPONENT

FIELD OF THE INVENTION

The invention relates to an electro-optical high-index contrast waveguide component, particularly for integrated optics and optical telecommunication engineering.

BACKGROUND OF THE INVENTION

Using light for information transfer offers a series of advantages in comparison to pure electrical procedures, primarily, when high data rates are needed or long distances have to be covered. In contrast, digital processing and storage of information is today carried out almost exclusively electronically in integrated components, which are mostly produced on the basis of silicon, for in example in Complementary Metal Oxide Semiconductor Technology (CMOS). For converting information between electronic storage and processing components and optical transmission lines, electro-optical components, which may be integrated with electronic circuits, therefore are of great interest.

Today, fast electro-optical modulators are mostly integrated on substrates, which have a strong linear electro-optical effect (Pockels effect), with which substrates the refraction index may be changed for at least one polarisation by applying a voltage. Examples for such materials are lithium niobate ($LiNbO_3$), ammonium dihydrogen phosphate (ADP), potassium dihydrogen phosphate (KDP), beta barium borate (BBO), or gallium arsenide (GaAs). The changing of the refraction index in these materials is particularly based on the non-linear polarisation of bounded electrons by the applied electric field and practically occurs instantaneously. Typically, waveguide-based components are provided in the form of stripes with low index contrast, diffused into (e.g. 0.2% for the diffusion of Ti into $LiNbO_3$). Typically, the electric voltage is applied via supply lines, which extend on the surface of the substrate directly over the waveguide or a little bit laterally shifted parallel to the waveguides. In (order to avoid optical losses, these supply lines need to have a certain minimal distance to the optical waveguide, or, however, the part being adjacent to the wave guide has to be made of transparent material. Such an arrangement is known from the patent application publication US 2003/0053730.

These modulators have a plurality of disadvantages: On the one hand, they may be integrated only very difficultly in electronic components on a common substrate, since many substrates being usually used to implement electronic components, particularly silicon, have no or only a very poor— and therefore not being technically useable—linear eletro-optical effect.

Furthermore, waveguide curves often may only be provided with large radii of curvature, since the index contrast of the waveguides diffused into is very low. Due to the same reason, branchings of these waveguides have also be dimensioned very lengthy. Therefore, miniaturizing these components is at least difficult. Furthermore, the mode field diameter is very large due to the low index contrast, and the volume, which has to be filled by the applied electric field, is accordingly large. Therefore, comparably high voltages are needed for operating such a modulator. At the same, both electrodes are usually placed on the surface of the substrate. Therefore, only a small part of the electric flux lines flows through the light-carrying region of the optical waveguide, and only this part contributes to the electro-optical interaction. The residual electric field unnecessarily increases the stray capacitance being in effect between the electrodes, and therefore the current being necessary for operating the modulator. In total, these components therefore need high input power, which can mostly be provided by special and expensive driver electronic circuits.

Besides the components being based on the linear electro-optical effect, semiconductor-based electro-optical modulators presently are matter of intensive research. Thereby, components are investigated based on the change of the complex refraction index due to injecting or spatially concentrating free charge carriers (see US 2005/0175270, US 2004/0208454, US 2005/0089257, or Liu et al., "A high-speeded silicon optical modulator based on a metal-oxide-semiconductor capacitor", Nature 427, page 615 ff., 2004).

The electric band width of these modulators, however, is comparably poor up to now, since either the life-time of the corresponding charge carriers acts restricting, or the velocity is relevant, with which the necessary amount of charge can be circulated.

Therefore, it is preferred to directly integrate components, which are based on fast electro-optical effects, for example the linear or the quadratic electro-optical effect, on substrates, which also are suited for implementing electronic components. For doing so, optical waveguides have to be provided with additional features not depending on the substrate material. This can be achieved by effecting a strong interaction of the guided light with suited surrounding material, for example electro-optical material. Particularly in case of combining a high-refractive waveguide core with a low-refractive surrounding material, this interaction can be increased due to the discontinuous superelevation of the normal component of the electric field at the dielectric boundary layer. The structure scientifically proposed in "Guiding and Confining light in void nanostructure", Opt. Lett. 29 (11), page 1211 ff., 2004 by Almeida, and discussed in further publications uses this principle for a special waveguide consisting of two parallel high-refractive stripes and a surrounding material embedded in-between.

Baehr-Jones et al., "optical modulation and detection in slotted Silicon waveguides", Opt. Express 13 (14), page 5216 ff., 2005 describes an implementation of structure, with which the waveguide stripes consist of doped silicon, and are embedded in a linear electro-optical polymer. By applying a voltage to the waveguide stripes, the refraction index in the spacing is changed, and the component may be used as electro-optical phase shifter. This component, however, has only a very small electric band width (appr. 6 MHz) not being useable in practice, since the electric supply lines only consist of a few thin silicon bars, and therefore are of very high resistance. Furthermore, producing the small gap between the waveguide stripes and filling it is technologically very demanding.

In the U.S. Pat. No. 6,993,212 B2, Block et al. describe an optical waveguide with a silicon waveguide core and an electro-optical waveguide cladding. Details concerning the dimensions of the structure are not given. Furthermore, metal is mentioned as electrode material. With metallic electrodes, typically, a relatively large minimal distance between the electrodes and the light guiding waveguide core has to be kept for avoiding optical losses. In case of the components having the same length, this in turn disadvantageously causes a relatively high operating voltage. Using the waveguide core itself as electrode is also not mentioned, and also not possible with the described metal electrodes, by implication. Furthermore, an adaptation of the group velocities between electric and optical signal, being advantageous for achieving a high band width is also not mentioned.

In US 2003/0174982 A1, Ridgway et al. describe (electrode and core arrangements for polarisation-independent waveguides. Generally, metal electrodes are used here, also. In one passage of the description transparent electrodes are even mentioned, but without more details concerning their design. Moreover, one has to assume that the material being proposed to do so, namely ITO, has a refraction index which is even a little bit higher than the refraction index of the used silica glass core so that also here an efficient light guiding demands relatively large distances between the core and the electrode, and therefore a relatively high operating voltage in case of the components having the same length. By all means, it is not a matter of a high-index contrast waveguide. Using the waveguide core as electrode is also not mentioned.

SUMMARY OF THE INVENTION

Therefore, it is an object of the invention to provide an electro-optical component, which has a large electric band width, and which may be operated at a low voltage and a low current, respectively.

It is a further object of the invention to provide an electro-optical component which is easy to produce and therefore cost-efficient and suitable for mass production.

It is still a further object of the invention to provide a compact electro-optical component which may be integrated together with electronic components on a common substrate.

The object of the invention is respectively solved by the subject matter of the independent claims. Advantageous further embodiments are subject matter of the dependent claims.

The principal item of the component according to the invention is a waveguide whose transmission properties may be changed by applying a voltage to an at least partially electro-optical surrounding or cladding material adjacent to the waveguide core and/or by impressing a current flow into this surrounding or cladding material.

As "electro-optical" in terms of this application/this patent, materials are referred to and understood, with which the optical properties, particularly the real part and/or the imaginary part of the complex refraction index, is changed for at least one polarisation in case of applying a voltage U and/or the current flow associated herewith. For example, substances belong to these materials, which substances show a linear electro-optical effect (Pockels effect) or a quadratic electro-optical effect (electro-optical Kerr effect). In terms of this description, electro-optical effects of higher order theoretically exist also, but up to now no materials are known with which these effects are sufficiently strong for being technically useable. But such materials shall not be excluded.

The compactness of the component is particularly ensured by using a high-refractive waveguide core for guiding the light. Preferably, the refraction index of the waveguide core is greater than 1.8. By doing so, a high integration level becomes possible. Furthermore, this core is surrounded with a low-refractive, at least partially electro-optical surrounding material such that an as large as possible part of the optical field starts interaction with this material. Preferably, the refraction index of the surrounding material is in the range from 1 to 3, wherein the index difference between the waveguide core and the surrounding material preferably is larger than, or equal to 0.5, more preferably greater than or equal to 1. Due to the high contrast of the refraction indices, the mode field diameter can be kept small. Preferably, the mode field diameter is less than or equal to 3 μm. Therefore, this component is a matter of a so-called high-index contrast waveguide component.

When doing so, the discontinuous field superelevation of the normal component of the electric field at the boundary layers of the core is purposefully exploited. For switching, the real or the imaginary part of the refractive index of the low-refractive material is changed by an electric field being externally applied. Since the waveguide core material itself does not need to have electro-optical properties (but this is not excluded), the core can be produced in a material system easy-to-structure, which enables the simultaneous integration of electronic components. In this respect, particularly so-called silicon-on-insulator-substrates (SOI) are of interest. The waveguide core may for example consist of doped or un-doped semiconductor material, for example silicon, and preferably has a diameter less than or equal to 5 $(\mu m)^2$, in many cases even less than 1 $(\mu m)^2$.

According to the invention, an electro-optical high-index contrast waveguide component is thus provided, based on the E-field induced electro-optical effect, comprising:

an one-piece or multipart high-refractive waveguide core in the form of one or more parallel waveguide core stripes for light guiding, low-refractive, particularly substrate-independent or substrate-different, optically transparent surrounding material, which encloses the waveguide core or its parts particularly above and below, or into which the waveguide core is particularly completely embedded except for existing, particularly transparent, electrically conducting supply lines, as the case may be, for example, and which interacts with the guided light, wherein the surrounding material has electro-optical properties at least in regions, and wherein the transmission properties of the waveguide may thus be changed as in reaction to the electric field, a first and a second conducting region or conducting layer, at least partially optically transparent and extending near the waveguide core along the propagation direction of the light, i.e. that extends along, and directly adjacent to the waveguide core, or in a small distance thereto, wherein the distance preferably is $<=20$ μm, more preferably $<=2.5$ μm, $<=1$ μm or $<=500$ nm, and preferably, a first and a second conductor path with the same or a higher electrical conductivity than the optically transparent conducting areas, the conductor extending along the propagation direction of the light, preferably each conductor being in the form of one or more stripe-like metal layers. Therefore, the non-transparent electric conductor paths extend parallel, and in a distance to the waveguide core, and preferably contact electrically the optically transparent electric conducting areas on a minimum length parallel to the propagation direction of the light (z direction).

Furthermore, the optically transparent electric conducting areas and/or the waveguide core and/or the parts of the waveguide cores form two or more optically transparent electrodes extending along the propagation direction of the light such that by applying an electric voltage to the electrodes on a certain length along the propagation direction of the light, an electric field is generated in the electro-optical surrounding material between the electrodes, and, by doing so, the optical properties of the electro-optical surrounding material is changed on an interaction length, wherein the electric field in the electro-optical surrounding material has a large overlap with the magnetic mode field of the guided light, wherein the optically transparent electric conducting areas are electrically connected to the conductor paths along the propagation direction of the light on the interaction length in order to supply a voltage to the electrodes on a wide length. The length of the area under voltage, i.e. the region along the propagation direction of the light, where the electro-optical interaction takes place (interaction region), is selected depending on the quality of the electro-optical surrounding material and on the group velocity of the light guided. Therefore, the interaction region is prolately expanded, and extends along the propagation direction of the light. Over the interaction length, the electric conductive paths are in contact with the transparent optical conductive regions. For a simple exemplary embodiment of the invention, the interaction length is about 50 mm, but it may be reduced down to about 150 µm by means of a suitable waveguide design for a technologically more complex structure, wherein an electro-optical coefficient of $r_{33}=50$ pm/V is taken as a basis. Therefore, with the electro-optical materials currently known, one has to start from the fact that the interaction between the electric field and the magnetic mode field takes place over a minimum length which is at least 30 µm, but minimally over at least 10 µm. To achieve this interaction length, the optically transparent conductive regions also extend on a length of at least 10 µm, particularly preferably at least 30 µm (minimum length) along the propagation direction of the light. With other words: The electrodes are connected to, and supplied with a voltage over the total minimum length (continuously or recurrently). Preferably, the optically transparent electric conductive regions are planar layers, and therefore extend in the propagation direction along the interaction length, as necessary, and are connected at low resistance to the conductor paths along this length. In this context, the term "low resistance" is referred to the cross conductance value $G'_p$, and has to be related to the capacity value $C'_p$ of the conductor. This may be quantified by the RC time constant $\tau_{3dB}=C'_p/G'_p$, for example. Preferably, $\tau_{3dB}$ is less than, or equal to 500 µs, more preferably less than or equal to 318 ps, and most preferably less than or equal to 100 ps. The optically transparent electric conductive areas may be continuous or structured, in order to prevent light to be emitted into or through these areas, for example.

Such material may also be used as electro-optical material, with which the changing of the optical properties is completely or partially caused by a current flow being attended by the applied voltage. Then, the aforesaid explanations have to be applied analogously.

For example, the electro-optical material is a carbon compound with electro-optical properties, an electro-optical polymer, or a silicon compound, for example $SiO_x$, $SiN_x$, $SiC_x$, which compound is doped with other substances (particularly from the group of rare earths, for example Er, Yb), as the case may be.

Thus, the electro-optical material may be superimposed as solution by spin-coating, for example, or, by gas phase or fluid phase deposition (for example by vapour deposition, PVD, CVD, MOCVD or the like). Thus, it is a material being able to be coated in gas phase or fluid phase deposition, for example.

Preferably, the optically transparent electric conductive areas consist of doped semiconductor material (for example, containing silicon with a doping density of $5\times10^{15}$ to $5\times10^{18}$ foreign atoms per cubic centimetre, or of a doped or un-doped metal oxide (for example indium-tin-oxide (ITO), ZnO or $In_2O_3$) or of a conductive polymer. Due to the electric supply line of low resistance, extending along the propagation direction, the changing of the electric existing between both electrodes may nevertheless take place very fast such that a 3 dB threshold frequency of the electro-optical modulation $f_{3dB}=G'_p/(2\pi C'_p)$ greater than or equal to 500 MHz, preferably greater than or equal to 2 GHz is achieved, for example.

The 3 dB threshold frequency is taken to mean the frequency, at which the amplitude of the phase shift is lower by a factor $1/\sqrt{2}$ compared with its value at frequency zero.

Preferably, the impedance of the electric conductor extending along the waveguide is between 9Ω and 81Ω.

On certain conditions, furthermore, it is advantageous to design the component such that at least 40% of the guided optical power propagates in the low-refractive material.

The invention may be realised at least in three following embodiments (A), (B), and (C) (see FIG. 2 (A) to 2 (C)):

(A) The first and the second optically transparent electric conductive region form the first or second transparent electrode. In this case, the waveguide core is arranged between the first and the second electrode, and the electric field induced by the external field permeates the surrounding material in the region around the waveguide core, and the waveguide core itself. At this, the shortest passage-way between the electrodes, located in a plane of cross section of the waveguide preferably permeates the waveguide core, and high electric field strengths are thus achieved in the region of the waveguide core and its adjacencies. This embodiment may particularly realised with a one-piece waveguide core. If desired, the waveguide core may also be multi-part.

(B) The first optically transparent electric conductive region forms a supply line applying electrical contact to the waveguide core, and the waveguide core itself forms the first electrode. As with embodiment (A), the second electrode is formed by the second optically transparent electric conductive region. In this case, the electric field induced by the external voltage permeates the surrounding material between the waveguide core and the second conductive region. With this embodiment (B), the waveguide core is electrically conductive, and be one-piece or multipart, as with embodiment (A).

(C) The waveguide core is multi-part such that the waveguide core at least consists of a first and a second waveguide core stripe. The first and the second optically transparent electric conductive area apply electrical contact to the first or second waveguide core stripe such that the first and second waveguide core stripe form the first and the second electrode respectively, and the optically transparent electric conductive areas functionally form supply lines to the respective electrode. When doing so, the electric field induced by the external voltage therefore permeates the surrounding material between the first and the second waveguide core stripe being electrically conductive.

Preferably, the arrangement of waveguide core, surrounding material, optically transparent electric conductive area and the conductor paths is superimposed on a substrate made of non-electro-optical material, particularly a semiconductor substrate, for example a doped or un-doped silicon substrate. In this case, a part of the surrounding material is arranged between the waveguide core and the substrate. Therefore in a particularly advantageous manner, electric or electronic components may additionally be integrated on the same substrate.

With the embodiments (B) and (C), emission of optical power into the optically transparent conductive areas, which here form one or two supply lines, may be avoided by selecting a sufficiently low-refractive material, or by a suited design. For example, the conductive regions are designed as conductor layers having a reduced height and/or a reduced refraction index than the waveguide core. Furthermore, the low-ohmic connection between the waveguide core stripes and the associated conductor paths may be provided by optically transparent electrically conductive supply line layers having cross bars consecutively repeated along the propagation direction, or the low-ohmic connection may be provided by structures having a photonic bandgap. Particularly preferably, the structures are provided such that the group velocities of the electric signal and of the optical signal are equal or only slightly different from each other. The "slight deviation" may be quantified by means of defining an upper limit for the relative group delay time difference $\Delta\tau_{gd}$ of the electric signal and the optic signal. The product of $\Delta\tau_{gd}$ multiplied by the modulation frequency f may serve as a quantitative criterion, here. For this purpose, the following preferably applies: $f^*\Delta\tau_{gd}<=0.56$, more preferably $f^*\Delta\tau_{gd}<=0.30$. Furthermore, either especially the amplitude or especially the phase or the frequency respectively of the transmitted light, or both is preferably changed by applying the voltage. Furthermore, the phase shift $\Delta\Phi$, relating to the waveguide length (L) and to the externally applied voltage (U) preferably is at least $\Delta\Phi/(L\times U)=1000(Vm)^{-1}$.

The waveguide core and/or at least one of the surrounding regions may also have structurings along the propagation direction of the light, which structurings influence the dispersion relation of the optical mode. Included are structurings being regularly along the propagation direction particularly, which structurings reduce the group velocity of the guided light, or may be used for dispersion compensation.

With arrangements with low group velocity, a certain electro-optical interaction may already be achieved on a shorter distance, since the light stays longer in the interaction area. For example, other conditions being equal, the same electro-optical phase shift may be achieved with a waveguide structure of about 400 µm length, in which structure the group velocity is 5% of the vacuum speed of light, like with a structure of about 3 mm length, in which the group velocity is 35% of the vacuum speed of light, and with which structure no special measures for reducing the group velocity have been taken. In both cases, the time of the light being in the interaction area is about 27 ps. This time still may be considerably reduced by means of better electro-optical materials and higher operating voltages. But one has to assume that the interaction between the electric field and the optic mode field has to take place for at least 0.3 ps, but minimally for 0.1 ps. With other words: The length of the transparent electric conductive regions and their contact length with the waveguide or with the waveguide stripes respectively along the propagation direction of the light is at least selected such large that the length of interaction time between the electric field and the optical mode field within the length of the transparent electric conductive areas is at least 0.1 ps, more preferably at least 0.3 ps. Therefore, the optical mode field propagates along the waveguide for at least 0.1 ps or 0.3 ps respectively between the transparent optical conductive regions, i.e. within the length, which is applied a voltage to at low resistance, and therefore is filled with an electric field being changeable in wide-band. Therefore, the advantage of the low-ohmic voltage supply line extending along this minimal distance by means of the transparent electric conductive regions is that also in case of high band widths, a sufficient length of interaction time between the electric field and the optical mode field is ensured.

Furthermore, suitably dimensioned transition areas (so-called "tapers") may be used for coupling into and/or uncoupling light, which areas cause an adiabatic change of the dispersion relation, or coupling into and/or uncoupling light takes place by means of suitably dimensioned resonators. Also, the component may be embedded in resonant or interferometric structures.

The electro-optical component may particularly be used in an electrically tuneable dispersion compensator, an (amplitude) modulator, or Mach Zehnder interferometer, wherein in case of the Mach Zehnder interferometer, at least one arm preferably has an electro-optical component according to the invention, in form of a phase shifter. Particularly preferably, in every arm, the Mach Zehnder interferometer has an electro-optical component according to the invention, in form of a phase shifter, and the phase shifters being in different arms are controlled by means of voltages having opposite sign (so-called "push-pull-operation").

The interaction between the optical field and the externally applied electric field is high at the time when both fields fill the same spatial area. For a waveguide infinitely extending perpendicular to the (x,y)-plane, this can be quantified in first order by means of an overlap integral of the form $$\Gamma = \iint (\chi^{(n)} \vdots \vec{E}_{opt} \ldots \vec{E}_{el \ldots 1 \ldots}) \vec{E}^*_{opt} dxdy \qquad \text{Equ.1}$$

where $\vec{E}_{opt}(x,y)$ represents the complex electric field of the optical mode, $\vec{E}_{el}(x,y)$ represents the electric field externally applied by means of the electrodes, and $\chi^{(n)}(x,y)$ represents the non-linear susceptibility tensor of order n. The integration area covers the whole cross area of the waveguide, ":" indicates the tensor product, and "·" stands for the scalar product of two vectors. A high efficiency of the component, for example in form of a modulator, is achieved at the time, when this overlap integral takes high values. This maximization is achieved by means of a suitable arrangement of the electrodes. It is particularly included that in case of embodiment (A), the electrodes extend in a short distance to the waveguide. In order to avoid optical losses, the parts of the electrodes being permeated by the optical field are made of a transparent material.

The time being needed to build up the electric field in the electro-optical material is decisive for the electric band width of the component. For doing so, the capacity between the edges facing each other of the electrodes or the parts of the waveguide used as electrodes respectively, being linked with this electric field has to be charged. Preferably, this takes place via the conductor paths extending near the waveguide. The conductor paths may extend in a suitably large distance to the waveguide core such that it is not necessary to design them transparent. Therefore, particularly metal layers may be used, where a voltage may easily applied to, for example by means of wire-bonding methods (in contrast to the most transparent electrically conductive materials). But a low-ohmic cross connection between the conductor paths and the edges facing each other of the transparent electrodes or the parts of the waveguide used as electrodes respectively is important for a high band width. In the following, this will be quantified a little more specific.

FIG. 1 shows the electric equivalent circuit diagram of a structure element of length $\Delta z$. R' and L' are the resistance and the inductivity values of the conductor paths in z-direction; C' is the capacity value being connected with the electric field to be build up, and G' is the conductance value of the cross connection between the conductor paths and the edges facing each other of the electrodes or the parts of the waveguide used as electrodes respectively. The values being relevant for modulating the signal is the voltage $U_g(z)$ falling between these edges, i.e. at the cross capacity $\Delta C_p = C'\Delta z$. The frequency response of the ratio of this voltage to the total voltage between the conductor paths corresponds to a first order low-pass system with a 3 dB threshold frequency of $$f_{3dB} = G'_p/(2\pi C'_p). \qquad \text{Equ.2}$$

Primarily, the capacity value C' is defined by the distance of the inner edges of the electrodes, and therefore already fixed by the maximization of the overlap according to equation 1.

Therefore, the conductance value G', which is essential to be maximized, remains as the only free parameter for increasing the electric band width. A low-ohmic electrical supply which therefore is of wide-band, to the transparent electrodes is achieved by means of cross bars that are planar, unified or continuously repeated in the propagation direction the cross bars extending to the low-ohmic conductor paths. Since these structures partially are in direct contact with the waveguide core, it is important to design them in such a manner that emitting light into, or over these areas is definitely avoided.

In the following, the invention is in more detail described on the basis of embodiments and with reference to the figures, wherein same and similar elements are partially referred to with same reference signs, the features of the different embodiments may combined with each other, and features described together may be of importance also when taken uniquely. Particularly, the lower and upper limits of interval have also separately to be understood for defining one-sided open parameter intervals.

DETAILED DESCRIPTION OF THE INVENTION

Figure 1:
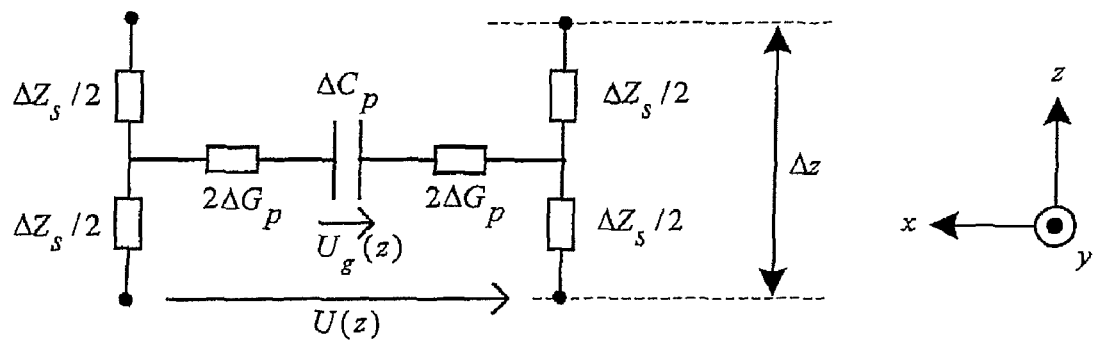
FIG. 1 shows an electric equivalent circuit diagram of a structure element of length $\Delta z$. The series impedance $\Delta Z_s = R'\Delta z + j\omega_{el} L'\Delta z$ is composed of the ohmic and the inductive contribution of the conductor paths extending longitudinally. The cross conductance $\Delta G_p = G'\Delta z$ represents the finite conductivity of the transparent supply line area, and $\Delta C_p = C'\Delta z$ the corresponding cross capacity. R', L', G', C' are the resistance, inductivity, conductance, and capacity values of the arrangement, respectively.
Figure 2:
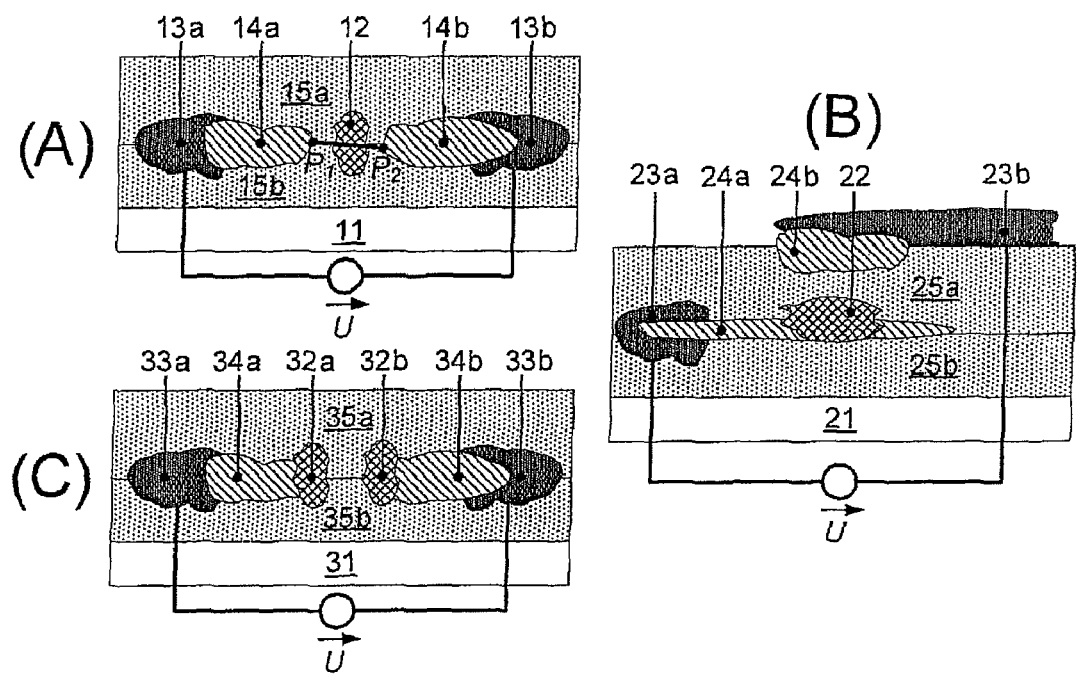
FIG. 2(A) to (C) show schematic cross sections of the three exemplary embodiments of the invention, already discussed above.

FIG. 2 shows schematic waveguide cross sections of the three exemplary embodiments of the invention, already addressed. Thereby, the principle arrangement of the different elements is essential. The geometric forms have to be understood as being exemplary. The substrates 11, 21, 31 may consist of one or more layers not being differentiated here, which may serve for implementing electric components, for example.

The voltage U to be applied for changing the transmission properties is depicted in FIG. 2 in each case. This voltage and/or the current being generated by it allows to change the transmission properties of the waveguide.

In FIG. 2 (A), the high-refractive one-piece or multi-part waveguide core 12 is surrounded by one or more low-refractive materials 15a, 15b, at least one of these having electro-optical properties. The mode field of the light being guided in the waveguide extends into the electro-optical material. A spatially concentrated electric field having a large overlap with the optic mode field may be generated by means of transparent electrodes 14a, 14b extending closely along the waveguide, and being provided by optically transparent electric conducting layers. For reducing the supply line resistance, the transparent electrodes may additionally be in electric contact with low-ohmic conductor paths 13a, 13b extending in a certain distance to the waveguide. The whole arrangement may be integrated on a substrate 11. The electrodes may consist of any conductive optically transparent material, but must not disadvantageously influence guiding the light along the core 12.

A large overlap of the fields is achieved by means of a suitable inter-coordinated arrangement and form of the electrodes 14a, 14b and of the waveguide core 12. For example, the following consideration offers an indication concerning the design: Let $P_1$ and $P_2$ those points on the electrodes, being in the common cross plane of the waveguide, which have minimal distance to each other. In this cross section plane, the distance $P_1 P_2$ therefore represents the shortest connection between the two electrodes. If a voltage is applied to the electrodes, the highest field strengths result in the surrounding of this line. In order to achieve a sound overlap of the optical mode field and the electric field existing between the electrodes, the electrodes 14a, 14b are arranged around the waveguide core such that, as shown in FIG. 2 (A), the line $P_1 P_2$ permeates the waveguide core and is divided by the core into two portions approximately having the same length. In addition, the form and the distance of the electrodes 14a, 14b is selected together with the form of the waveguide core 12 such that technological boundary conditions may be fulfilled, and the field overlap according equation 1 be maximal.

In FIG. 2 (B), the one-piece or multi-part waveguide core 22 itself is electrically conductive, and is used as one of the electrodes. With a multi-part waveguide core, all parts of the core are on the same electric potential. The core is surrounded by low-refractive materials 25a, 25b, which have electro-optical properties in the region 25a. A second, transparent electrode formed by an optically transparent electrical conductor layer, as the case may be, is arranged such that the electro-optical material 25a is between it and the waveguide core 22. Via an one-piece or multi-part transparent supply line area 24a, the waveguide core is in electric contact with at least one conductor path 23a extending along the waveguide. The electrode 24b may also be in electric contact with a conductor path 23b extending nearby. The whole arrangement may be integrated on a substrate 21, i.e. the surrounding material is a superimposed material, and not part of the substrate itself.

In FIG. 2 (C), the waveguide core consists of two high-refractive stripes 32a and 32b electrically insulated from each other, which are surrounded by one or more low-refractive materials 35a and 35b, at least one of them having electro-optical properties. The parts 32a and 32b are conductive themselves, act as electrodes and get different electric potentials by applying a voltage. At low resistance, they are connected with at least one conductor path 33a, 33b extending along the waveguide by means of transparent supply line regions 34a and 34b. The whole arrangement may be integrated on a substrate 31.

With the embodiments according to FIG. 2 (A) and (B), generally no small slots have to be filled with an electro-optical material—in contrast to the structure shown in FIG. 2 (C). Therefore, the structures (A) and (B) may be provided easier as a rule, but generally the overlap between optical and electric fields is worse than in structure (C).

In case of the structures shown in FIG. 2 (B) and FIG. 2 (C), the light guiding core of the waveguides 22 or 32a, 32b directly adjoins the transparent supply line regions 24a or 34a, 34b, i.e. it is directly contacted by the latter. Therefore, these supply line regions have to be constructed such that emitting optical power is avoided. This may be achieved either by selecting materials having a suitably low refractive index or by suitably forming these regions. For example, they may be realized as thin layers, or even have a structuring, which has a photonic band gap in the corresponding wave length range. It is therefore particularly possible to use the same material for the waveguide core and the supply line regions, for example a semiconductor material.

The arrangements described above do not necessarily be integrated on substrates. The waveguide cores or their parts 12 or 22 or 32a, 32b may also consist of thin fibres being embedded in the low-refractive cladding material. For example, such fibres may relatively easily be produced by means of drawing-out suited materials. Such an embodiment is not shown.

In all three shown embodiments (A), (B) and (C), a high index contrast at the boundary layers between the wave guide cores 12 or 22 or 32a, 32b and the cladding materials 15a, 15b or 25a, 25b or 35a, 35b causes a saltus in the normal component of the electric field. If the polarisation of the electric field was selected properly, this discontinuity can well-directed be used to increase the interaction of the guided light with the cladding material.

Particularly large electric band width may be achieved, if the electric and the optical signals propagate at same group velocities. This so-called travelling field arrangement may be achieved by means of appropriately designing the electric conductor paths, or by means of appropriately designing the wave guide or its cladding material respectively. In this context, a high index contrast between core and cladding material turns out to be very advantageous: The range, over which the effective refraction index $n_e$ of the optical mode can be adjusted, is limited upwards by the refraction index of the core, and limited downwards by the highest refraction index occurring in the cladding material. With a high-index contrast waveguide component, $n_e$ may therefore be varied over a very large range. The same applies for the group velocity of the optical mode, which therefore may well be adapted to the velocity of the electric signal.

In the subsequent figures and descriptions, various exemplary embodiments of the three embodiments of FIG. 2 (A) to (C) of the invention are shown. All figures have to be understood exemplarily, and particularly are not true to scale. For the sake of clearness, the underlying substrate 11, 21, 31 is not depicted.

The materials, material combinations and indications of measurement in the following mentioned for SOI-based realizations have to be considered as exemplary, and do not demand completeness or exclusivity. All refraction indices mentioned in the following refer to—unless otherwise noted—a wave length of 1550 nm, and have also be considered as exemplary for the spectral range being usual in the optical telecommunication engineering.

Figure 3:
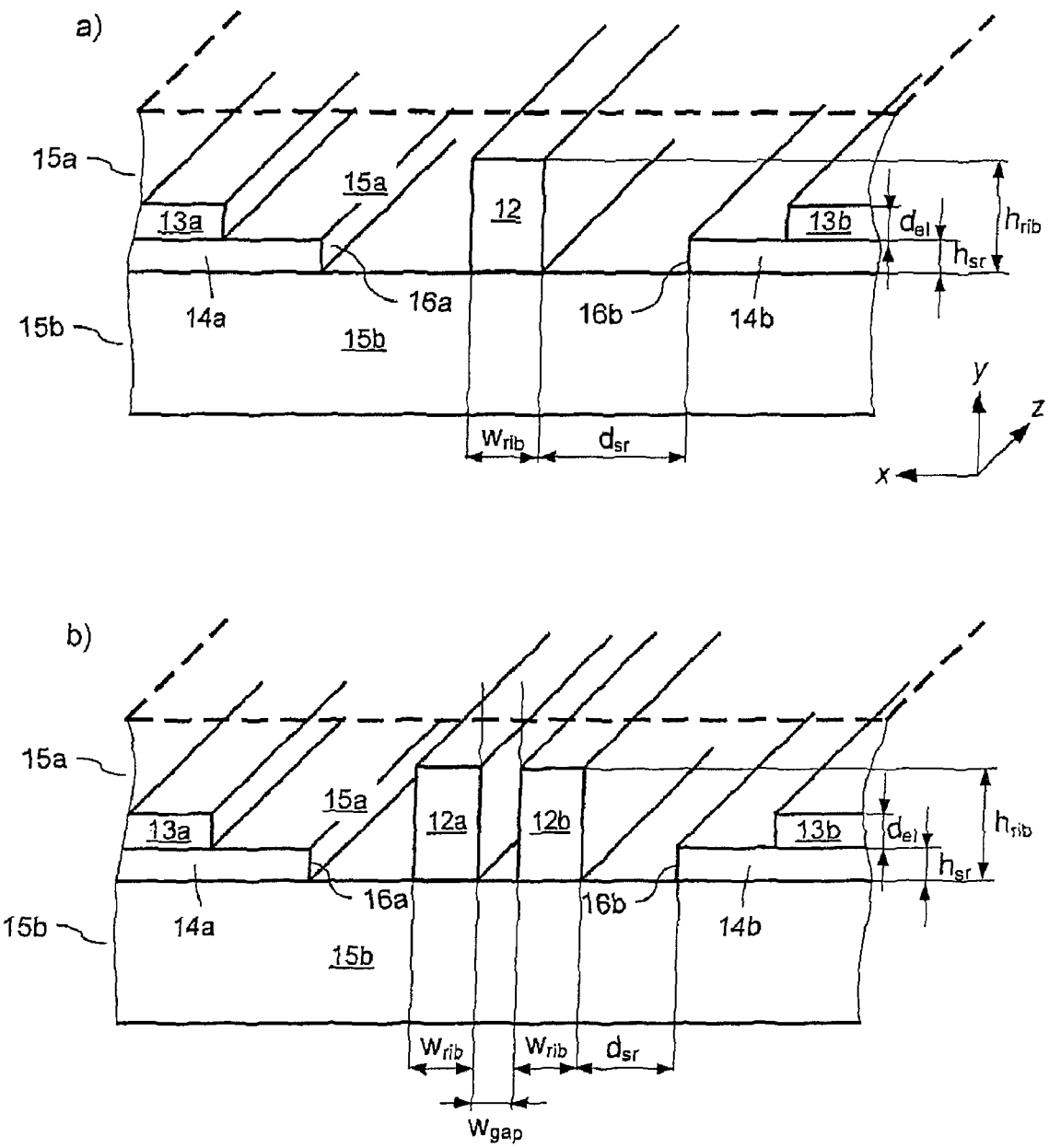
FIG. 3 shows perspective cross sections of examples of waveguides with one-piece or multi-part core, and separate electrodes, which are not part of the core according to FIG. 2 (A).

The structures exemplarily shown in FIG. 3 are based on the principle being outlined in FIG. 2 (A). The waveguide core is only used for guiding the light, and not used as electrode. The external voltage is applied between the conductor paths 13a and 13b.

FIG. 3 a) exemplarily shows a structure, whose waveguide core 12 consists of stripe of high-refractive material, and is arranged on a low-refractive, not necessarily electro-optical layer 15b. The waveguide core is covered by an electro-optical material 15a. The electric field is formed between the transparent electrodes extending along both sides of, and closely to the waveguide core, more precisely between the sides 16a, 16b facing each other. As the case may be, the conductor paths 13a and 13b lower the resistance value R' of the structure.

For a SOI-based realisation of the structure, the waveguide core 12 may exemplarily consist of silicon (Si, n=3.48), or of a silicon compound (silicon nitride, silicon oxinitrid, silicon carbide), and the buried oxide ($SiO_2$, n=1.44) may be used as underlying layer 15b. Particularly, the refraction index of the waveguide core preferably is between 3.4 and 3.6, and the refraction index of the surrounding material is preferably between 1.4 and 2.4 so that the refraction index of the waveguide core preferably is higher by at least 1 or by 1 to 2.2 than the refraction index of the surrounding material. But chalco genide glasses may also be used as surrounding material, which glasses have a refraction index up to about 3.0 so that also refraction index differences starting at 0.4 come into consideration.

Then, the width $w_{rib}$ of the waveguide core 12 and the height of the waveguide core 12 preferably are in the range 50 nm to 1 μm. The thickness $h_{sr}$ of the transparent conducting regions or electrodes 14a, 14b preferably is in the range 20 nm to 3 μm, preferably, the thickness $h_{sr}$ is less than 1 μm, particularly preferably less than 300 nm. The distance $d_{sr}$ of the transparent conducting regions 14a, 14b to the waveguide core 12 preferably is in the range 100 nm to 20 μm. Doped silicon or a metal oxide is used for the transparent conducting regions 14a, 14b, for example. The conductor paths 13a and 13b are exemplarily made of a metal.

Besides the pertinently known inorganic crystals ($LiNbO_3$, BBO), the electro-optical material may be a functionalised polymer, for example a "guest-host" polymer or a "cross-linked" polymer, an organic crystal, for example DAST (4-N, N-dimethyl amino-4'-N'-methyl-stilbazolium tosylate, or DAT2 (2-{3-[2-(4-dimethyl amino phenyl)vinyl]-5,5-dimethyl cyclohex-2-enylidene}malononitrile), or an organic salt, for example DSTMS (4-N,N-dimethyl amino-4'-N'-methyl-stilbazolium 2,4,6-trimethyl benzene sulfonate), or DSNS (4-N, N-dimethyl amino-4'-N'-methyl-stilbazolium 2-naphtalene sulfonate). As the case may be, these materials have to be poled by applying a voltage. Furthermore, electro-optical interactions may be achieved in materials only having a non-linear effect of third order (quadratic electro-optical effect), for example glasses (chalco genide glasses). These materials may be poled by applying a voltage.

FIG. 3 b) exemplarily shows a likewise structure as FIG. 3 a). Here, however, the waveguide core consists of two stripes 12a and 12b of the high-refractive material. The electro-optical material 15a surrounds the wave guide, and particularly fills the slot between the stripes 12a and 12b, partially or completely. By means of this arrangement, it is possible to guide a large portion of the optical power in the electro-optical material 15a, and nevertheless to keep the diameter of the mode field, and therewith the volume to be filled with the electric field small. In case of a SOI-based realisation, the width $w_{rib}$ of the waveguide core stripes 12a, 12b preferably is in the range 50 nm to 800 nm. The height $h_{rib}$ of the waveguide core stripes 12a, 12b preferably is in the range 50 nm to 1 μm. The distance $w_{gap}$ between the waveguide core stripes 12a, 12b preferably is in the range 30 nm to 500 nm. The thickness $h_{sr}$ of the transparent conducting areas or the electrodes 14a, 14b respectively preferably is in the range 20 nm to 3 μm, and the distance $d_{sr}$ of the transparent conducting areas or electrodes 14a, 14b respectively to the waveguide core stripes 12a, 12b preferably is in the range 100 nm to 20 μm.

In case of the components shown in FIG. 3, the interaction length between the applied electrical field and the optical field preferably is maximally 15 mm, particularly preferably maximally 7.5 mm, 2 mm, or 1 mm. The thickness $d_{el}$ of the conducting areas preferably is in the range of 20 nm to 2 µm, particularly preferably in the range of 50 nm to 1 µm.

Figure 4:
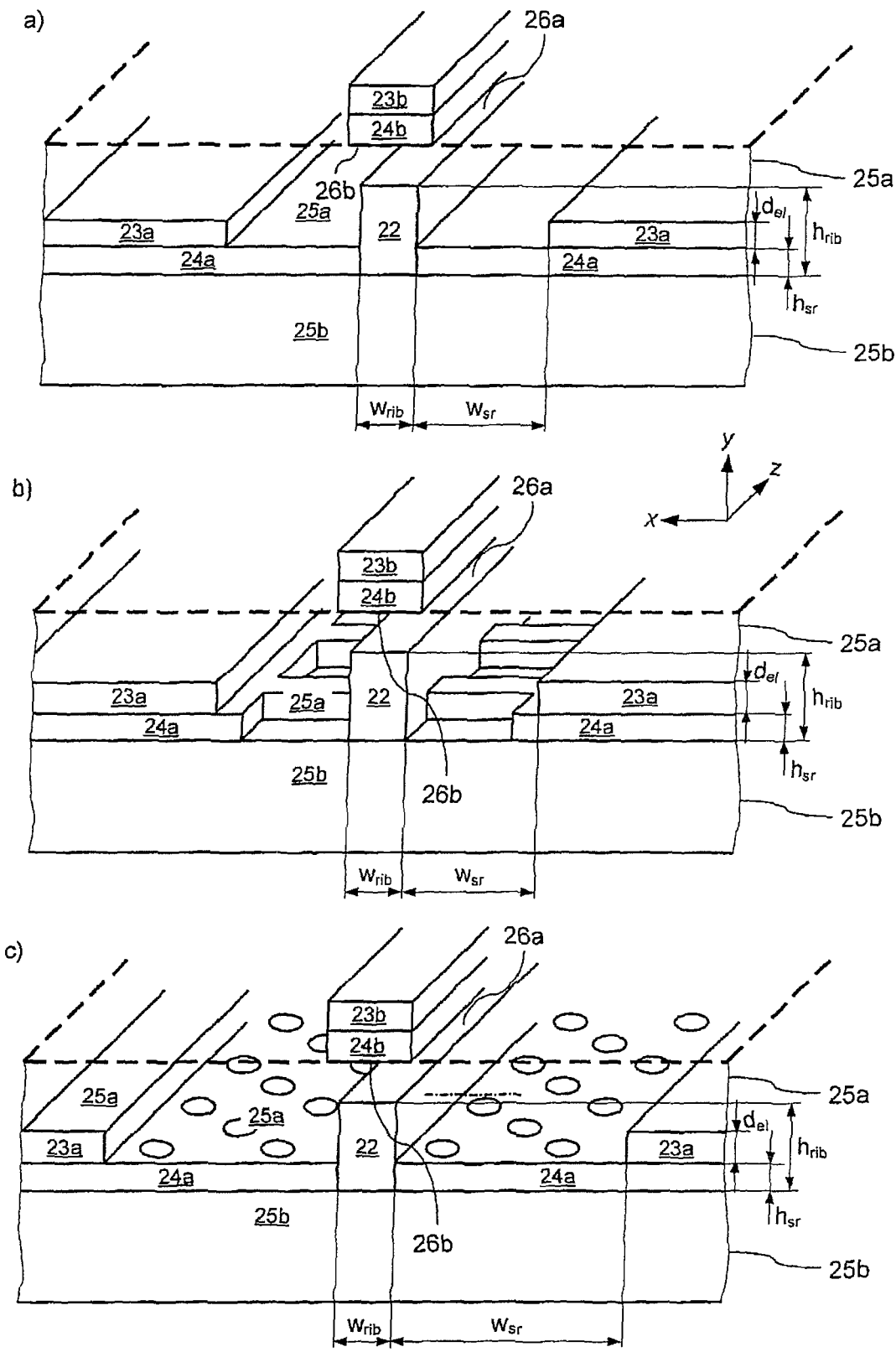
FIG. 4 shows perspective cross sections of examples of waveguides, with which the core is used as one of the two electrodes according to FIG. 2 (B).

The structures exemplarily shown in FIG. 4 are based on the principle being outlined in FIG. 2 (B). The waveguide core is used as one of the electrodes, wherein with a multi-part core, all components have the same electric potential. The same applies for the parts of the conductor paths 23a. They are electrically connected with each other via the electrically conductive regions 24a, and, as the case may be, the core 22, and therefore have the same potential. The external voltage is applied between the conductor paths 23a and 23b. Of course, asymmetric structures may be realised, wherein which the right or the left part of the conductor paths and the corresponding supply line region are omitted.

In FIG. 4 a), the waveguide core 22 exemplarily consists of a stripe of electrically conductive high-refractive material, which stripe is on a low-refractive, not necessarily electro-optical layer 25b. At the same time, it serves as electrode, and is connected with conductor paths 23a extending near to the, for example metallic, waveguide via conductive, optically transparent layer 24a laminarily expanded on both sides along the wave guide. Overcoupling optical power into the layer 24a is avoided by selecting the thickness $h_{sr}$ sufficiently small and/or by the material used having a lower refraction index than the waveguide stripes 22. For a suitable selection of $h_{sr} < h_{rib}$, it is particularly possible to use the same material for the layer 24a functionally acting as supply line as for the waveguide stripes 22. The waveguide core 22 is covered by an electro-optical material 25a, on which a transparent anti-electrode 24b is attached, which is also formed by a conductive, optically transparent layer. The sides of the electrodes, facing each other are referred to as 26a, 26b. For lowering the electric resistance value R', the counter-electrode 24b is in contact with an optically non-transparent metal conductor path 23b extending near the waveguide.

For a SOI-based realisation of the structure, the waveguide core 22 may exemplarily consist of doped silicon (Si, n=3.48) or of a metal oxide, and for example, the buried oxide (SiO$_2$, n=1.44) is used as underlying layer 25b. Then, the width $w_{rib}$ and the height $h_{rib}$ of the waveguide core 22 preferably are in the range 50 nm to 1 µm. The thickness $h_{sr}$ of the transparent conductive regions 24a and/or 24b preferably is in the range 20 nm to 3 µm, and the distance $w_{sr}$ of the conductor paths 23a to the waveguide core 22 preferably is larger than 300 nm. For example, doped silicon or a metal oxide is used for the transparent supply line regions 24a. Likewise, the counter-electrode 24b consists of a metal oxide, for example. Exemplarily, the conductor paths 23a and 23b are made of a metal, and the electro-optical material is a polymer, for example.

The structure exemplarily shown in FIG. 4 b) is related to the structure shown in FIG. 4 a). In propagation direction, the supply line regions 24a, however, have continually repeated bars made of the electrically conductive, optically transparent material. By selecting the distances and the widths of these bars properly, the dispersion relation of the optical wave guide may be adjusted. Exemplarily, this may be used for reducing the length of the component, as exemplarily, the group velocity of the guided light is reduced, and therewith the interaction time is increased. Furthermore, the group velocity of the optical mode may be adapted to the group velocity of the electric signal, and such a component with high band width may be achieved (travelling wave arrangement). For the bars, doped silicon or a metal oxide is used, for example.

The structure exemplarily shown in FIG. 4 c) is related to the structure shown in FIG. 4 a), too. In contrast to 4 a), here the supply line regions 24a, however, have a special shape. They consist of a connected area of an electrically conductive, optically transparent material that is structured such that is has a photonic band gap (PBG), and thus emitting optical power into and through these areas is minimized. Therewith, it is particularly possible to use the same material and the same layer thickness for the supply line regions 24a like for the waveguide core 22 (not shown in FIG. 4c), but see FIG. 5c). Additionally, the dispersion relation of the optical waveguide may be adjusted by means of a suitably designing the areas of the PBG structure, being adjacent to the core. Particularly, this may be used to reduce the length of the component, exemplarily by lowering the group velocity of the guided light, and therewith increasing the interaction time. Furthermore, the group velocity of the optical mode may be adjusted to the group velocity of the electric signal, such achieving a component with high band width (travelling wave arrangement).

With the components shown in FIG. 4, the interaction length between the applied electric field and the optical field preferably is maximally 15 mm, particularly preferably maximally 7.5 mm, 2 mm, or 1 mm. The thickness $d_{el}$ of the conductive regions preferably is between 20 nm and 2 µm, particularly preferably between 50 nm and 1 µm.

Figure 5:
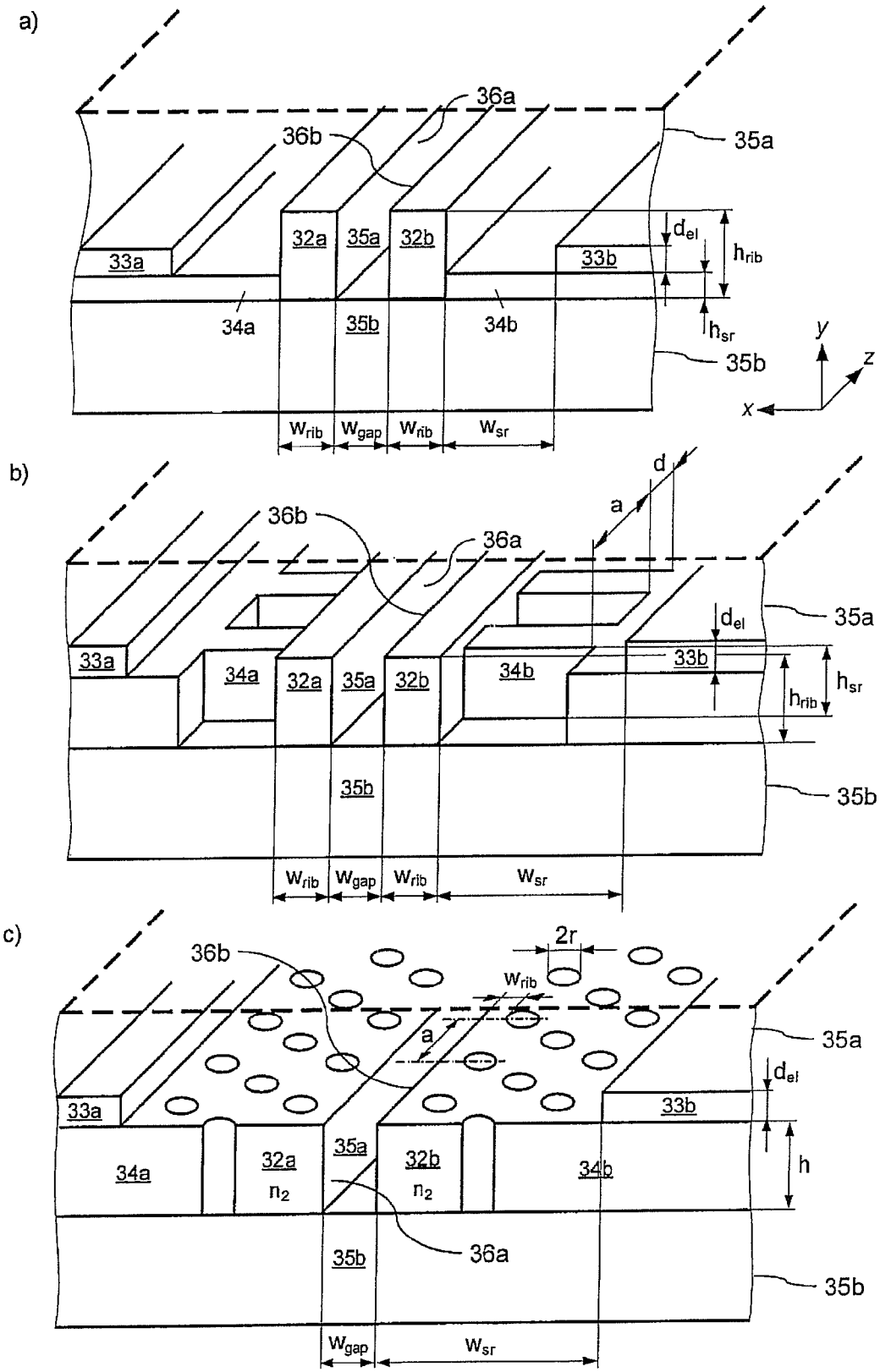
FIG. 5 shows perspective cross sections of examples of waveguides consisting of two stripes isolated from each other, which are used as electrodes according to FIG. 2 (C).

The structures exemplarily shown in FIG. 5 are based on the principle shown in FIG. 2 (C): The waveguide core consists of two parts or stripes 32a and 32b, which themselves are used as electrodes, and between which the external voltage is applied.

In FIG. 5 a), the waveguide core consists of two parallel, electrically conductive stripes 32a and 32b being insulated from each other and being made of an optically transparent, high-refractive material. At the same time, these stripes 32a, 32b act as electrodes with sides 36a, 36b facing each other. They are on an electrically insulating, low-refractive, not necessarily electro-optical layer 35b. The light is guided along the slot between the stripes 32a, 32b, in which slot a strong electric field is generated by the applied voltage U. The stripes 32a and 32b are surrounded by a low-refractive material 35a having electro-optical properties, and which particularly, completely or partially fills the slot between the stripes 32a, 32b, also. The electric voltage is supplied via also conductive and optically transparent supply layers 34a and 34b laminarily expanded along the waveguide. Overcoupling optical power into these layers is avoided by selecting their thickness $h_{sr}$ sufficiently small and/or by the used material having a lower refraction index than the waveguide stripes 32a and 32b. For a suitable selection of $h_{sr} < h_{rib}$, it is particularly possible to use the same material for the supply line regions 34a and 34b as for the waveguide stripes 32a and 32b. Additional, not necessarily transparent conductor paths 33a and 33b lower, as the case may be, the electric resistance value R' of the structure.

For a SOI-based realisation of the structure, the stripes 32a and 32b forming the waveguide core may consist of doped silicon (Si, n=3.48), and the buried oxide (SiO2, n=1.44) may be used as underlying layer 35b. Then, the width $w_{rib}$ of the waveguide core stripes 32a, 32b is preferably in the range 50 nm to 800 nm. The height $h_{rib}$ of the waveguide core stripes 32a, 32b is preferably in the range 50 nm to 1 µm. The distance $w_{gap}$ of the waveguide core stripes 32a, 32b from each other preferably is in the range 30 nm to 500 nm. The thickness $h_{sr}$ of the optically transparent conductive areas 34a, 34b preferably is in the range 20 nm to 3 µm, and the distance of the non-transparent conductive paths 33a, 33b to the waveguide core stripes 32a, 32b preferably is larger than 300 nm.

For example, doped silicon or a metal oxide may be used for the transparent supply line areas 34a and 34b. The conductor paths 33a and 33b may exemplarily be made of a metal, and the electro-optical material may be a polymer.

The structure exemplarily shown in FIG. 5 b) is related to the structure shown in FIG. 5 a). Here, the supply line areas 34a and 34b, however, comprise bars made of an electrically conductive, optically transparent material, which bars are continually repeated along the propagation direction. For a SOI-based realisation, the bar distance a preferably is larger than 30 nm, and the bar width d preferably takes values being larger than 20 nm.

By suitably selecting the form, i.e. particularly the distances and the widths of these bars, the dispersion relation of the optical waveguide may be adjusted. Particularly, this may again be used for reducing the length of the component, exemplarily by lowering the group velocity of the guided light, and therewith increasing the interaction time. Furthermore, the group velocity of the optical mode may be adjusted to the group velocity of the electric signal, such achieving a component with high band width (travelling wave arrangement).

The structure shown in FIG. 5 c) is related to the structure shown in FIG. 5 a), too. In contrast to 5 a), here the supply line regions 34a and 34b, however, have a special shape. They consist of a connected area of an electrically conductive, optically transparent material that is structured such that is has a photonic band gap (PBG) in the corresponding wave length range, and thus emitting optical power into and through these areas is minimized. Therewith, it is particularly possible to use the same material and the same layer thickness for the supply line regions 34a and 34b as for the waveguide core stripes 32a, 32b. This special case is shown in FIG. 5 c). For a SOI-based realisation, the width $w_{rib}$ of the waveguide core stripes 32a, 32b preferably is in the range 50 nm to 800 nm. The thickness h of the waveguide core stripes 32a, 32b as well as of the transparent line areas 34a, 34b preferably is in the range 50 nm to 1 µm, and the distance $w_{gap}$ of the waveguide core stripes 32a, 32b from each other preferably is between 30 nm and 500 nm, particularly preferably between 30 nm and 200 nm. Depending on the thickness h, the hole spacing a is preferably in the range 200 nm to 600 nm, and the ratio r/a (r: hole radius) preferably takes values between 0.2 and 0.45, as the case may be, between 0.15 and 0.4, too.

Additionally, the dispersion relation of the optical waveguide may be adjusted by means of suitably designing the areas of the PBG-structure, being adjacent to the core. For doing so, the diameters and the positions of the holes being adjacent to the core are varied conveniently. Particularly, this may be used for reducing the length of the component, exemplarily by lowering the group velocity of the guided light, and by doing so, increasing the interaction time, and reducing the necessary interaction length. When doing so, the group velocity of the light preferably is lower than or equal to 35%, particularly preferably lower than or equal to 5% of the vacuum speed of light. Additionally, the chromatic dispersion of the optical mode may be adjusted by a suitable waveguide design. This allows the construction of dispersion compensators, for example.

Furthermore, the group velocity of the optical mode may be adjusted to the group velocity of the electric signal, such achieving a component with high band width (travelling wave arrangement).

With the components shown in FIG. 5, the interaction length between the applied electric and the optical field preferably is 7.5 maximally, particularly preferably 2.5 mm, 1 mm or 500 µm, maximally. The thickness $d_{el}$ of the conductive areas preferably is between 200 nm and 2 µm, particularly preferably between 50 nm and 1 µm.

If, in case of the aforementioned structures, the group velocity of the guided light is lowered by means of a suitable design, components having an interaction length of preferably 250 µm maximally, particularly preferably 100 µm maximally are possible. The same applies form using the aforementioned structures in resonant arrangements.

Figure 6:
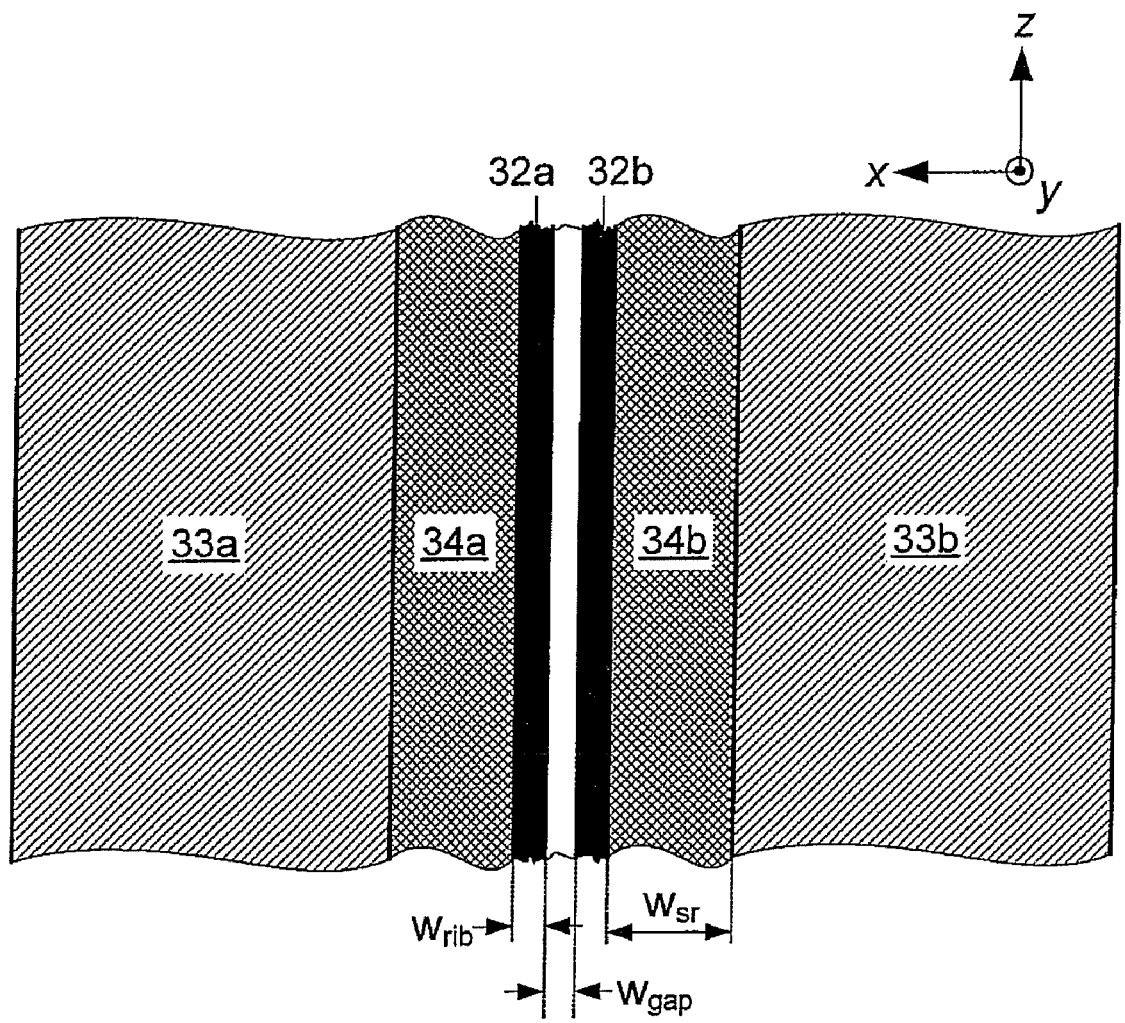
FIG. 6 shows the component of FIG. 5a) in a topview.

FIG. 6 shows the component of FIG. 5a) in a top view. The electro-optical cladding material 25a, which is brought in between the two stripes 32a, 32b, and which covers the stripes 32a, 32b as well as the optically transparent supply lines 34a, 34b and partially the conductor paths 33a, 33b is not shown. The optically transparent supply lines 34a, 34b as well as the conductor paths 33a, 33b extend in this example over a length of some hundred micrometers in the propagation direction of the light (z-direction), each on the sides of the waveguide core stripes 32a, 32b, averted from each other, and are in electric contact with the corresponding stripes over the whole length. In this example, the conductor paths 33a and 33b are formed as metal layers which are laminarily coated on the conductive regions 34a and 34b respectively. The conductive regions 34a, 34b also are directly electrically connected with the corresponding stripes over the whole length of some hundred micrometers (contacting length) so that the mode field propagates at a group velocity of about −0.35 times the vacuum speed of light for some picoseconds within the contacting length. The waveguide core 32a, 32b may still extend beyond the contacting length for coupling in and out the optical signals.

Therefore, the following preferably applies for all embodiments:

The two transparent conductive regions are not arranged in the same plane and on the same side of the waveguide core at the same time, but the waveguide core is preferably arranged between the transparent conductive areas so that interrupting the waveguide core is avoided over the interaction length.

The transparent conductive regions 14a, 14b; 24a, 24b; 34a, 34b (supply lines or electrodes) extend parallel to the one-piece or multi-part waveguide core 12, 12a, 12b; 22; 32a, 32b. The transparent conductive regions 14a, 14b; 24a, 24b; 34a, 34b either directly abut on the one-piece or multi-part waveguide core 12, 12a, 12b; 22; 32a, 32b or extend in a low distance to the latter so that the minimal distance of the transparent conductive regions 14a, 14b; 24a, 24b; 34a, 34b from each other is mainly defined by the width $w_{rib}$ of the waveguide core and by the width $w_{rib}$ of the waveguide core stripes and the distance $w_{gap}$ between the waveguide core stripes. This means that the distance between the two transparent conductive regions 14a, 14b; 24a, 24b; 34a, 34b from each other is preferably=50 nm. On the other hand, the distance $d_{sr}$ of the transparent conductive regions 14a, 14b; 24a, 24b; 34a, 34b (supply lines or electrodes) to the one-piece or multi-part waveguide core 12, 12a, 12b; 22; 32a, 32b preferably is less than or equal to 20 µm, less than or equal to 2.5 µm, less than or equal to 1 µm, or less than or equal to 500 nm.

Furthermore, the distance of the non-transparent conductor paths 13a, 13b; 23a, 23b; 33a, 33b from the waveguide core and/or from each other greater than the distance of the transparent conductive regions 14a, 14b; 24a, 24b; 34a, 34b from the waveguide core and/or from each other. Thereby, the distance of the non-transparent conductor paths 13a, 13b; 23a, 23b; 33a, 33b from the one-piece or multi-part waveguide core 12, 12a, 12b; 22; 32a, 32b preferably is >=300 nm, >=1 μm, >=10 μm, or >=20 μm.

Therefore, a waveguide-based, electro-optical component, which may be integrated together with electronic components on a common semiconductor substrate (e.g. silicon) is the subject matter of the invention. It provides a high electric band width, and may be operated at low voltages. Such a high-index contrast waveguide component is a key component, when bringing together electronic (CMOS-based) information processing and optical information transfer.

The invention claimed is:

1. An electro-optical high-index contrast waveguide component in which light is guided in lengthwise direction of the component, comprising:
    waveguide core means for guiding light in said lengthwise direction and having a high refractive index,
    cladding material having a lower refractive index than said waveguide core means, said cladding material extending along said lengthwise direction and surrounding said waveguide core means, said cladding material having at least partially electro-optical properties and interacting with the guided light,
    a first and a second electric conductive region which are at least partially optically transparent and extend adjacent to said waveguide core means over a length along said lengthwise direction which has at least a minimum length,
    wherein at least two of a group consisting of said first and second at least partially optically transparent electric conductive regions, said waveguide core means and parts thereof form at least a pair of a first and a second at least partially optically transparent electrode that extend along said lengthwise direction such that by applying voltage to said electrodes, an electric field is generated between said electrodes which modifies said optical properties of said electro-optical cladding material on an interaction length along said lengthwise direction, wherein said electric field has an overlap with the optical mode field in said electro-optical cladding material, and
    wherein said minimum length of said first and second at least partially optically transparent electric conductive regions in said lengthwise direction is at least so large that the time of said interaction between said electric field and said optical mode field within said interaction length is at least 0.1 picoseconds.

2. The waveguide component set forth in claim 1, wherein said high-refractive index of said waveguide core means and said lower refractive index of said electro-optical material make a high index contrast at contact surfaces between said waveguide core means and said electro-optical cladding material such that a saltus in a normal component of said electric field is created at said contact surfaces allowing to increase said interaction between said light guided in said waveguide core means and in said electro-optical cladding material, when said electric field is polarized suitably.

3. The waveguide component set forth in claim 1, further including metal layers to form conductor paths in said lengthwise direction, wherein said first and second at least partially optically transparent electric conductive regions are in electric contact at low resistance with said conductor paths.

4. The waveguide component set forth in claim 3, wherein said waveguide core means, said electro-optical cladding material, said first and second at least partially optically transparent electric conductive regions, and said conductor paths form an arrangement on a semiconducting substrate.

5. The waveguide component set forth in claim 1, wherein said waveguide core means comprises one or more optical fibres being embedded in said electro-optical cladding material.

6. The waveguide component set forth in claim 1, wherein the modification of the optical properties of said electro-optical cladding material is partly or completely caused by an electric current that is induced by said applied voltage.

7. The waveguide component set forth in claim 1, wherein said first at least partially optically transparent electric conductive region forms said first electrode, and said second at least partially optically transparent electric conductive region forms said second electrode, said waveguide core means being arranged between said first and said second electrodes such that an electric field generated by an external voltage permeates said electro-optical cladding material in a region surrounding said waveguide core means.

8. The waveguide component set forth in claim 1, wherein said first at least partially optically transparent electric conductive region is in electric contact with at least a portion of said waveguide core means, this portion of said waveguide core means forming said first electrode, and said second at least partially optically transparent electric conductive region forming said second electrode so that an electric field generated by an external voltage permeates said electro-optical cladding material between said waveguide core means and said second at least partially optically transparent electric conductive region.

9. The waveguide component set forth in claim 1, wherein said waveguide core means is a multi-part member in the form of at least a first and a second waveguide core stripe, said first at least partially optically transparent electric conductive region being in electric contact with said first waveguide core stripe which forms said first electrode, and said second at least partially optically transparent electric conductive region being in electric contact with said second waveguide core stripe which forms said second electrode such that an electric field generated by an external voltage permeates said electro-optical cladding material between said first and said second waveguide core stripes.

10. A high-index contrast waveguide component for guiding light in a lengthwise direction comprising:
    waveguide core means of a one-piece or multi-part construction having a high refractive index,
    low-refractive cladding material surrounding said waveguide core means and being in interaction with light guided in said waveguide core means, said cladding material having at least partially electro-optical properties, and
    at least two electrodes extending lengthwise in proximity to said waveguide core means and being partially or completely optically transparent,
    wherein said waveguide core means are electrically insulated from said electrodes and arranged between said electrodes such that, by applying a voltage to said electrodes, an electric field is generated in a region around said waveguide core means so as to modify said electro-optical properties of said electro-optical cladding material on an interaction length with said waveguide core means.

11. The high-index contrast waveguide component set forth in claim 10, further comprising:
    a pair of conductor paths having high conductivity and extending lengthwise in proximity to said waveguide core means,
    wherein each said electrode is connected to a corresponding one of said conductor path pair at low resistance along said lengthwise direction such that an electric field induced between said at least partially optically transparent electrodes is modifiable in a fast manner.

12. The high-index contrast waveguide component set forth in claim 10, wherein, in a cross section, the shortest line between said electrodes of said waveguide component crosses said waveguide core means so as to achieve a high field strength of said electric field in a region of said waveguide core means and its proximate surroundings.

13. A high-index contrast waveguide component for guiding light in a lengthwise direction of the component, comprising:
high-refractive waveguide core means made of an electrically conductive material of a one-piece or multi-part construction, said waveguide core means forming at least one first electrode that is electrically connected to at least one at least partially optically transparent electric supply layer,
low-refractive cladding material surrounding said waveguide core means, having at least partially electro-optical properties and being in interaction with said light guided in said waveguide core means on an interaction length,
at least one second electrode which is completely or partially optically transparent and extends lengthwise in proximity to said waveguide core means, wherein a space is present between said waveguide core means and said second electrode, said space is at least partially filled with said electro-optical material so that, by applying a voltage between said waveguide core means and said second electrode, an electric field is generated in said electro-optical material between said waveguide core means and said second electrode so as to modify said optical properties of said electro-optical material.

14. The high-index contrast waveguide component set forth in claim 13, further comprising:
a first conductor path of high conductivity extending lengthwise in proximity to said waveguide core means, wherein said waveguide core means forms said first electrode and is connected along said lengthwise direction to said first conductor path at low resistance such that said electric field between said second electrode and said waveguide core means is modified in a fast manner.

15. The high-index contrast waveguide component set forth in claim 14, wherein said connection between said waveguide core means and said first conductor path is low-ohmic and is provided in form of a flat extending, compact or structured, optically transparent and electrically conductive layer.

16. The high-index contrast waveguide component set forth in claim 14, wherein said second electrode is in the form of a flat extending, compact or structured in lengthwise direction, optically transparent and electrically conductive layer that is connected low-ohmic to a second conductor path extending lengthwise in proximity to said waveguide core means.

17. A high-index contrast waveguide component for guiding light in a lengthwise direction of the component, comprising:
high-refractive waveguide core means having a high refractive index and being of multi-part construction including at least a first and a second electrically conductive waveguide core stripe, said core stripes extending parallely and being electrically insulated from each other so that the core stripes form at least a first and a second electrode, respectively, with a space therebetween,
low-refractive cladding material surrounding said core stripes and having at least partially electro-optical properties, said space between said core stripes being completely or partially filled with said low-refractive electro-optical material, said low-refractive, electro-optical material being in interaction on an interaction length with said light guided in said waveguide core means,
a first and a second at least partially optically transparent supply layer electrically contacting said first and said second core stripes, respectively, for applying a voltage therebetween so as to generate an electric field in said low-refractive electro-optical material between said core stripes and to modify the optical properties of said electro-optical material,
wherein said supply layers are electrically connected to the corresponding core stripes along said lengthwise direction over a length which is at least so large that the time of interaction between said electric field and the optical mode field within this length is at least 0.1 ps.

18. The high-index contrast waveguide component according to claim 17, further comprising:
a first and a second conductor path of high conductivity extending lengthwise in proximity to said waveguide core means, wherein said first and second waveguide core stripes are connected low-ohmic to said first and second conductor paths, respectively, such that said electric field is modified in a fast manner.

19. The high-index contrast waveguide component according to claim 18, wherein said low-ohmic connection between respective of said waveguide core stripes and said conductor paths is provided by flat extending, compact or structured and at least partially optically transparent conductive layers.

20. The high-index contrast waveguide component according to claim 1, wherein the electric field of the utilized optical mode has a dominant component that permeates boundary surfaces between said high-refractive waveguide core means and said low-refractive electro-optical cladding material predominantly in perpendicular direction, and wherein the normal component of the electric field of said optical mode, has a discontinuous raising at said boundary surfaces, and said discontinuous raising is used to amplify the interaction of the light which is guided in the waveguide core means with said low-refractive electro-optical material.

21. The high-index contrast waveguide component according to claim 1, wherein said waveguide core means is of a semiconductor material which is doped or un-doped.

22. The high-index contrast waveguide component according to claim 1, wherein at least one of a group consisting of said waveguide core means and said first and second at least partially optically transparent electric conductive layers includes structurings arranged regularly along said lengthwise direction to influence dispersion relation of said optical mode in a predetermined manner so as to lower the group velocity of said guided light, or to cause a dispersion compensation.

23. The high-index contrast waveguide component according to claim 22, wherein, on the interaction length of the waveguide component, said group velocities of the electric signal and of the optical signal are equal or deviate only slightly from each other.

24. The high-index contrast waveguide component according to claim 1, wherein said waveguide core means is made of doped or un-doped silicon.

25. A device including a high-index contrast waveguide component according to claim 1, said device being one of a dispersion compensator, a phase modulator, a frequency modulator, an amplitude modulator and a Mach-Zehnder interferometer.

* * * * *